(12) United States Patent
Carabelli et al.

(10) Patent No.: US 8,583,325 B2
(45) Date of Patent: Nov. 12, 2013

(54) TILTING VEHICLE AND CONTROL SYSTEM THEREOF

(75) Inventors: Stefano Carabelli, Moncalieri (IT); Pietro Macchi, Moncalieri (IT)

(73) Assignee: Actua S.R.L., Turin (IT)

( * ) Notice: Subject to any disclaimer, the term of this patent is extended or adjusted under 35 U.S.C. 154(b) by 0 days.

(21) Appl. No.: 13/510,905

(22) PCT Filed: Nov. 18, 2009

(86) PCT No.: PCT/IT2009/000520
§ 371 (c)(1),
(2), (4) Date: Aug. 3, 2012

(87) PCT Pub. No.: WO2011/061768
PCT Pub. Date: May 26, 2011

(65) Prior Publication Data
US 2012/0310478 A1      Dec. 6, 2012

(51) Int. Cl.
*B60G 17/016*      (2006.01)
(52) U.S. Cl.
USPC .......................................................... 701/38
(58) Field of Classification Search
USPC .......................................................... 701/38
See application file for complete search history.

(56) References Cited

U.S. PATENT DOCUMENTS

| 6,575,263 | B2 * | 6/2003 | Hjelsand et al. | 180/402 |
| 2005/0145433 | A1 * | 7/2005 | Akuta et al. | 180/443 |
| 2007/0075517 | A1 * | 4/2007 | Suhre et al. | 280/124.134 |

FOREIGN PATENT DOCUMENTS

| EP | 2103471 A1 * | 9/2009 |
| WO | WO 2005102762 A1 * | 11/2005 |

* cited by examiner

*Primary Examiner* — Mary Cheung
*Assistant Examiner* — Anne Mazzara
(74) *Attorney, Agent, or Firm* — Matthew A. Pequignot; Pequignot + Myers LLC

(57) ABSTRACT

A vehicle comprises at least one steering wheel, at least two other wheels, control means suitable for being operated by a driver to steer the steering wheel, a frame supported by said wheels and tiltable with respect to the ground when the vehicle steers and first actuating means to control the tilting position of said frame. In particular, vehicle comprises a decoupling device to decouple the angular position of control means to the angular position of steering wheel and a control unit configured to activate first actuating means when control means are operated by the driver before said steering wheel substantially changes its angular position at least when said vehicle turns running above a given speed threshold.

17 Claims, 4 Drawing Sheets

TILTING VEHICLE AND CONTROL SYSTEM THEREOF

RELATED APPLICATION DATA

This application is the national stage entry of International Application No. PCT/IT2009/000520, filed Nov. 18, 2009. All claims of priority to this application are hereby made, and this application is hereby incorporated in its entirety by reference.

TECHNICAL FIELD

The present invention relates to a tilting vehicle comprising more than two wheels at least one of which is a tilting wheel, in particular a three-wheeled vehicle, and to a control system thereof.

BACKGROUND ART

A tilting vehicle with more than two wheels generally comprises a frame attached to the wheels in a tilting manner with respect to the ground so that the frame tilts during steering, actuating means connected to the frame and a tilting control unit connected to the actuating means to control the angular position of the frame.

Recently, compact tilting vehicles with more than two wheels were developed aiming at reducing pollution and traffic in big cities.

Controlling of the angular position of the frame and of the tilting wheels is an important issue relating to tilting vehicles.

Tilting vehicles are known where the tilting control unit uses a lateral acceleration sensing algorithm. In a lateral acceleration sensing algorithm (generally known in the scientific literature as "Direct Tilt Control, DTC"), a sensor measures the lateral acceleration of the frame during steering, the control unit elaborates sensor's output and drives the actuators to modify the angular position of the frame such that the weight and the centrifugal force are in rotational equilibrium about the tilting axis.

In this case, actuators are powered after the wheels substantially steer and an inertial load is generated during steering. This has the drawback that actuators requires the power to counterbalance the full steering inertial load. Another drawback is that steering inertial load is positively related to speed and may reach high values. Therefore wheels must have a relatively high lateral distance in order to avoid rollover and ensure stability in any driving condition.

DISCLOSURE OF INVENTION

The scope of the present invention is to provide a tilting vehicle free from the aforementioned drawbacks.

A further scope of the present invention is to provide a control method for a tilting vehicle.

The scope of the present invention is achieved by a vehicle according to claim 1 and a control method according to claim 14.

BRIEF DESCRIPTION OF THE DRAWINGS

For a better understanding of the present invention, said vehicle and said method are further described also with reference to the attached figures, wherein.

BEST MODE FOR CARRYING OUT THE INVENTION

Figure 1:
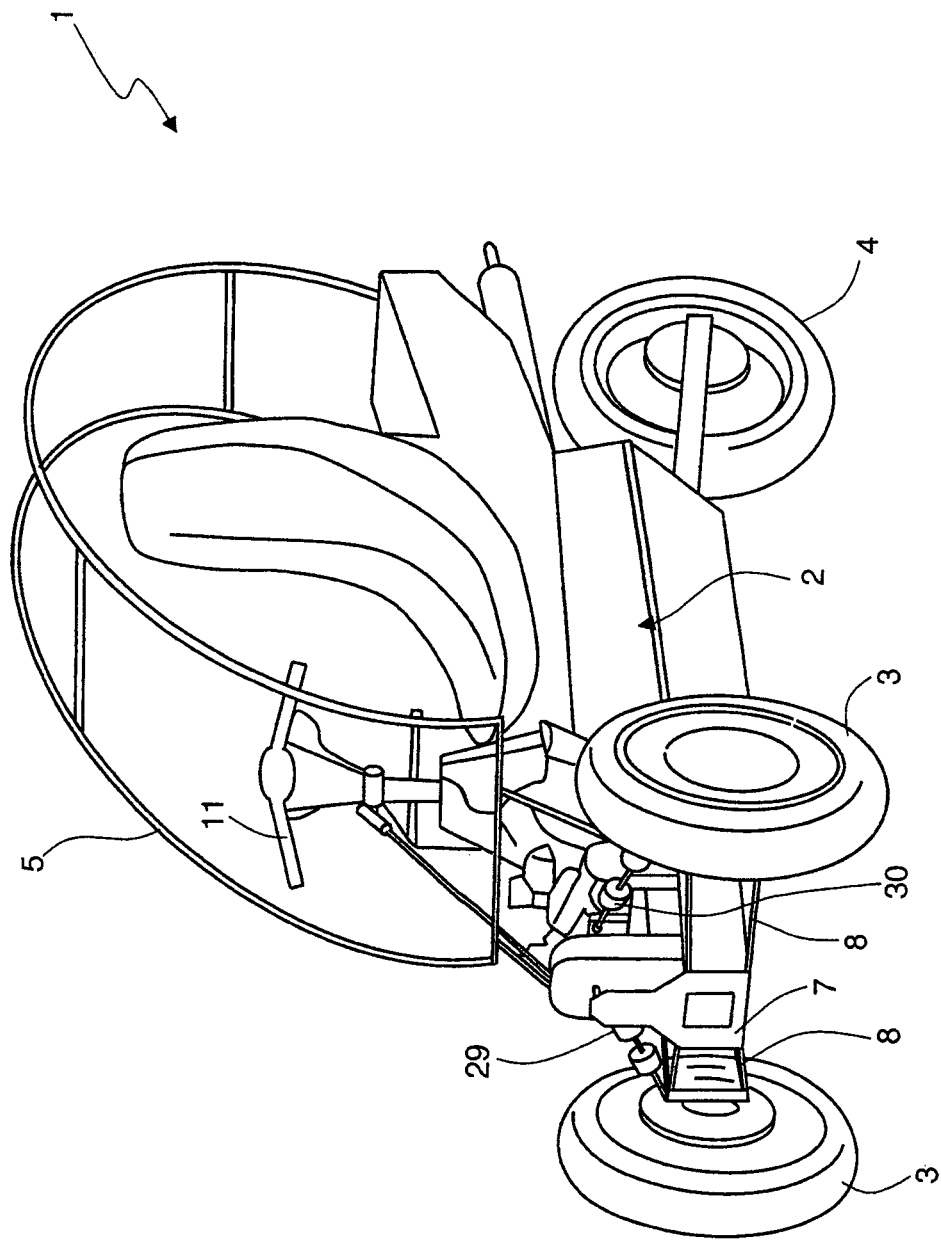
FIG. 1 is a perspective view of a vehicle according to the present invention with straight steering wheels and non-tilted frame.

In FIG. 1, designated as a whole by 1 is a tilting vehicle comprising a tilting frame 2, two front wheels 3 and a single rear wheel 4, wheels 3 and 4 being connected to frame 2. Frame 2 is a completely rigid frame supporting the components of the vehicle, e.g. internal combustion engine, seat of the driver, and can be configured with an upper portion 5 protecting the driver in the frontal, rear and upward direction.

Vehicle 1 further comprises an internal combustion engine driving rear wheel 4 and, preferably, electric motors housed in front wheels 3, i.e. front wheels 3 are electric motor wheels.

Front wheels 3 are connected to a front portion 7 of frame 2 by means of suspension wishbone arms 8 hinged to a hub-carrier supporting the rotating hub connected to front wheel 3 and to front portion 7. Wishbone arms 8 are connected to front portion 7 so that front wheels 3 and frame 2 tilt in a coordinated way, in particular by the same angle, when vehicle 1 is bending along a turn. Furthermore, connection of wishbone arms 8 is such that front wheels 3 can move independently from one another to absorb a relief or a depression of a street.

Advantageously, each front wheel 3 is connected to front portion 7 by an upper and a lower wishbone 8 and all wishbones 8 have the same length. Lower and upper wishbone 8 are parallel to one another in any working condition. For example, wishbones 8, front portion 7 and front wheels 3 are connected as described in patent application EP1798081.

Figure 2:
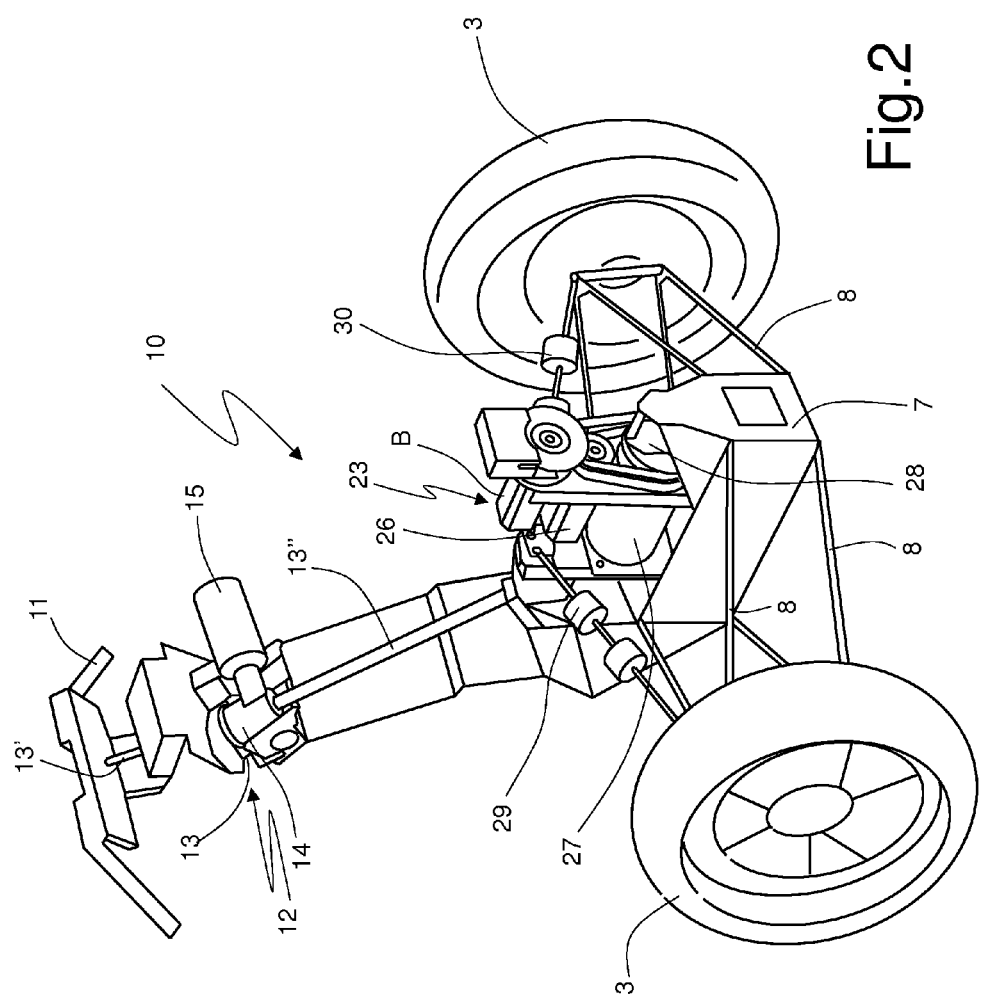
FIG. 2 is an enlarged perspective view of a front portion of FIG. 1.

In FIG. 2 a steering unit 10 of vehicle 1 is shown.

Steering unit 10 comprises a rotatable handlebar 11 directly operated by the driver and a device 12 configured to transmit the angular position of handlebar 11 to front wheels 3. Advantageously, device 12 comprises a rotatable steering column 13 connected to front wheels 3 in a manner that is known in the art and will not be described further, a torsionally resilient joint 14 to couple in a torsionally resilient manner handlebar 11 to wheels 3 and a steering actuator 15 (schematically shown in FIG. 1) providing the largest amount of torque to steer wheels 3. In particular steering column 13 comprises a first portion 13' connected between handlebar 11 and resilient joint 14, and a second portion 13" connected between joint 14 and front wheels 3.

According to a preferred embodiment of the present invention, resilient joint 14 is configured to have two stop position so that handlebar 11 and steering column portion 13" may relatively rotate within a predefined interval. Once the maximum relative angular position is reached in either, rotational directions, handlebar 11 and steering column 13 become connected in a rotationally rigid way so that if handlebar 11 is further rotated by a certain amount, steering column portion 13" is driven in rotation by the same amount.

Figure 3:
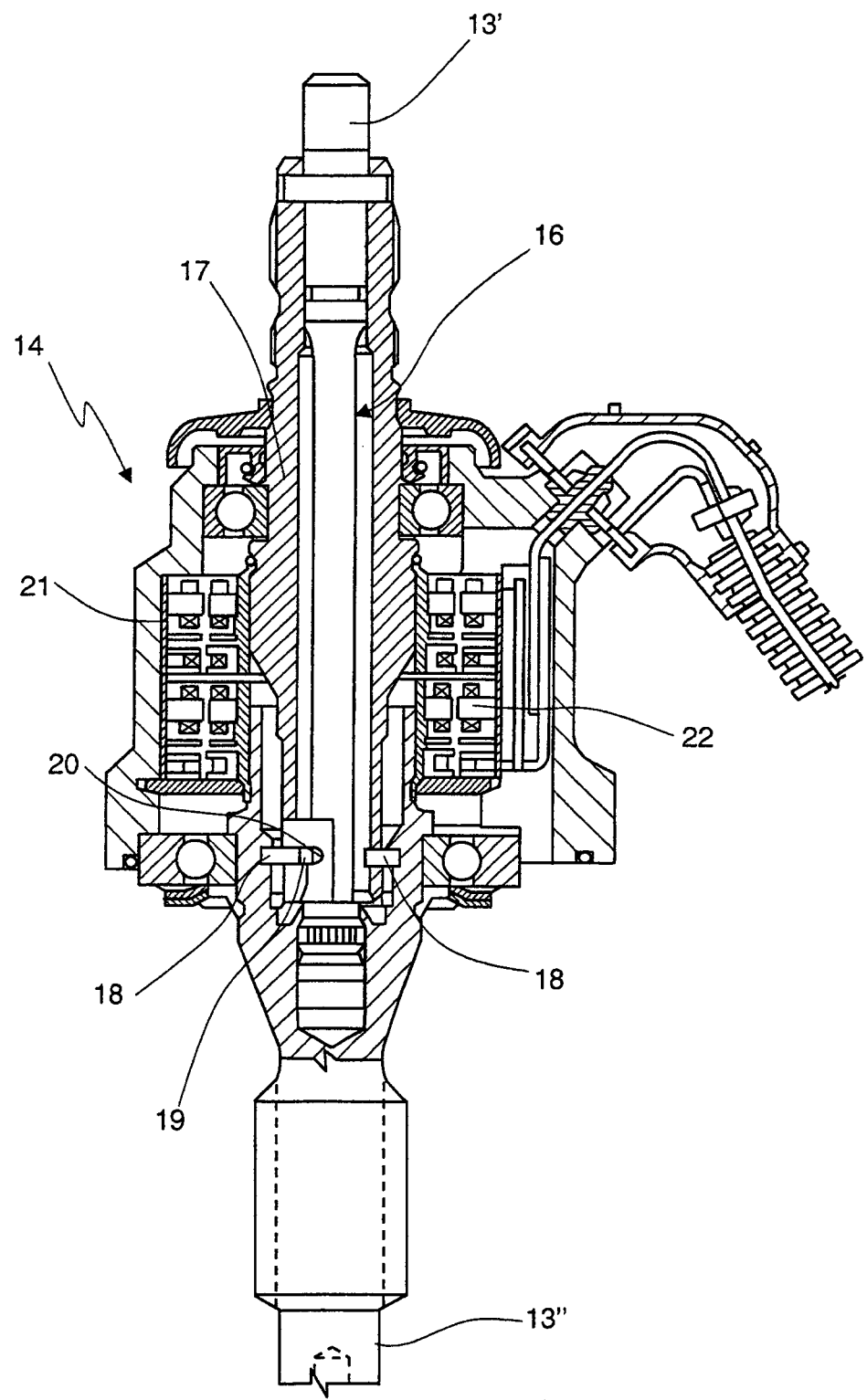
FIG. 3 is an enlarged, longitudinal cross section of a component of the steering unit of the vehicle of FIG. 1.

For example, resilient joint 14 comprises a torsion bar 16 connected between steering column portions 13' and 13", a sleeve 17 rigidly connected to steering column portion 13' and two fixed pins 18 radially extending from steering column portion 13" towards torsion bar 16. Each pin has an end portion engaging a respective circumferential slot 19 (only one slot is illustrated in FIG. 3) defined by sleeve 17. Furthermore, each slot 19 is circumferentially delimited by two abutments 20.

The angular interval wherein handlebar 11 and steering column portion 13" can relatively rotate is defined by the circumferential dimension of slot 19. When pins 18 contact either abutment 20, handlebar 11 is rigidly connected to steering column portion 13".

According to the present invention, resilient joint 14 also comprises a first and a second angular sensor 21 and 22 to detect the relative angular position of steering column portions 13' and 13". According to a preferred embodiment, output of sensors 21 and 22 can be combined to the stiffness of torsion bar 16 in order to evaluate the torque that the user applies to handlebar 11. However, unlike standard electric powered servo steering system, in the present invention the measure of steering wheel torque is not directly and immediately transformed into torque at the steerbox that rotates front wheels 3.

Vehicle 1 further comprises a tilting control unit that controls the tilting position of frame 2 with respect to the street surface. Such tilting control unit comprises actuating means 23 holding frame 2 in a preferred tilting position, a plurality of sensors 24 detecting dynamic parameters of vehicle 1 and an electronic control unit 25 elaborating the outputs of sensors 24 and of sensors 21, 22 to control steering actuator 15 and actuating means 23 through a signal S that will be better described later on.

Advantageously, actuating means 23 comprises a rotating motor 26, in particular an electric motor, a reduction gear 27 connected to the output of motor 26 by a transmission, e.g. a belt transmission, a crank arm 28 connected to a first output shaft of gear 27 and rising transversally, e.g. perpendicularly in a rest position, with respect to wishbone arms 8, and a brake B, e.g. a disk brake, to block motor 26, gear 27 and crank arm 28 in a preferred position. Disk brake B is controlled by electronic control unit as well.

Actuating means 23 and frame 2 are connected as follows.

Front portion 7 of frame 2 has a substantially parallelepiped shape each corner of which is hinged to a respective wishbone 8. Front portion 7 is rigidly connected to the housing of motor 26 and of gear 27.

Crank arm 28 is connected to both right and left upper wishbones 8 by means of a respective shock absorber 29 and 30 set at opposite sides with respect to crank arm 28.

During steering at a cruise speed, e.g. higher than 25 km/h, the user rotates handlebar 11 and sensors 21, 22 detect a change in the relative angular position between steering column portions 13', 13". According to the present invention, torsion bar 16 is designed to have a low stiffness such that a rotation of the handlebar 11 having pin 18 not contacting abutments 20 does not substantially steer front wheels 3 per se, i.e. front wheels 3 substantially steer either because of tilting and/or because of the activation of steering actuator 15 and do not substantially steer when handlebar is rotated and pin 18 is not contacting abutments 20.

At least at a high speed, immediately after handlebar 11 is rotated, front wheels 3 do not substantially rotate to follow the road bend according to the input given by handlebar 11 as in standard powered steering systems. On the contrary, electronic control unit 25 activates motor 26 to initiate tilting of frame 2 and front wheels 3 towards the centre of the bend.

After tilting of frame 2, ECU 25 may activate actuator 15 and wheels 3 further steer by the proper angle preferably calculated on the basis of the torque applied by the user to handlebar 11 in order to give to the driver the same feeling as with a torsionally rigid device 12, i.e. torsion bar 16 is a part of a torque sensor.

Therefore, according to the present invention, ECU 25 activates tilting of frame 2 and of wheels 3, 4, when the user rotates handlebar 11. The tilting of front wheels 3 produces per se a turning of vehicle 1. In order to provide the proper turning of vehicle 1 in view of the speed and the radius of curvature of the road bend, ECU 25 may activate steering actuator 15 to further steer front wheels 3. In particular, steering by tilting front wheels 3 together with frame 2 is very efficient when vehicle 1 runs at a high speed, e.g. above 25 km/h. More in general, ECU 25 implements a control method by which at low speed, i.e. below 25 km/h, wheels 3 steer because steering actuator 15 is actuated and frame 2 is maintained substantially perpendicular with respect to the ground surface. In such working condition it can be said that torsional stiffness of device 12 between handlebar 11 and front wheel 3 is maximum, ideally infinite, i.e. handlebar 11 and front wheels 3 are torsionally connected in a rigid way. Torsional stiffness between handlebar 11 and front wheels 3 is given by the combined effect of torsion bar 16 and steering actuator 15 and is variable. In particular, when a large torsion angle of handlebar 11 is detected by ECU 25 and the torsional stiffness of device 12 is set to be low, steering actuator 15 is activated so to give a small steering angle to front wheels 3. On the contrary, when torsional stiffness of device 12 is ideally infinite, ECU 25 activates steering actuator 15 so that handlebar 11 and portion 13" rotates by the same angle.

Preferably, ECU 25 activates steering actuator 15 depending on the speed of vehicle 1 measured by sensor 24. In particular, torsional stiffness of device 12 decreases when speed of vehicle 1 increases. Decrease of torsional stiffness may follow many different paths, e.g. continuous and monotone paths. When speed of vehicle 1 is low, the turning effect deriving from the tilting of front wheel 3 becomes less and less effective and turning takes place by steering front wheels 3 through steering actuator 15, as previously described.

For example, above the threshold set at 25 km/h, ECU 25 controls both steering actuator 15 and actuating means 23. In particular, stiffness of device 12 decreases so that when the driver turns handlebar 11 actuating means 23 are activates so that frame 2 and front wheels 3 tilt. Optionally, there is a time delay between activation of steering actuator 15 after the activation of actuating means 23. Such delay increases when the speed increases till steering 15 is not anymore activated and vehicle 1 steers only by tilting of front wheels 3 and frame 2. Such delay may combine with torsional stiffness change described above in the control method implemented by ECU 25.

When also actuator 15 is activated, ECU 25 continues to control the angular position of frame 2 in order to counterbalance the inertial load due to lateral acceleration of frame 2 itself and minimize the resulting overall force applied to the center of gravity of the frame. In particular, when sensor 24 also comprises a lateral accelerator, ECU 25 is configured to set the lateral acceleration at a level that is perceivable by the driver, so that When vehicle 1 comes around the road bend, the torque on handlebar 11 reverses and ECU 25 activates actuating means 23 to tilt and 'rise' frame 2. Actuator 15 is activated to steer front wheels 3 only after actuating means 23 is powered.

Figure 4:
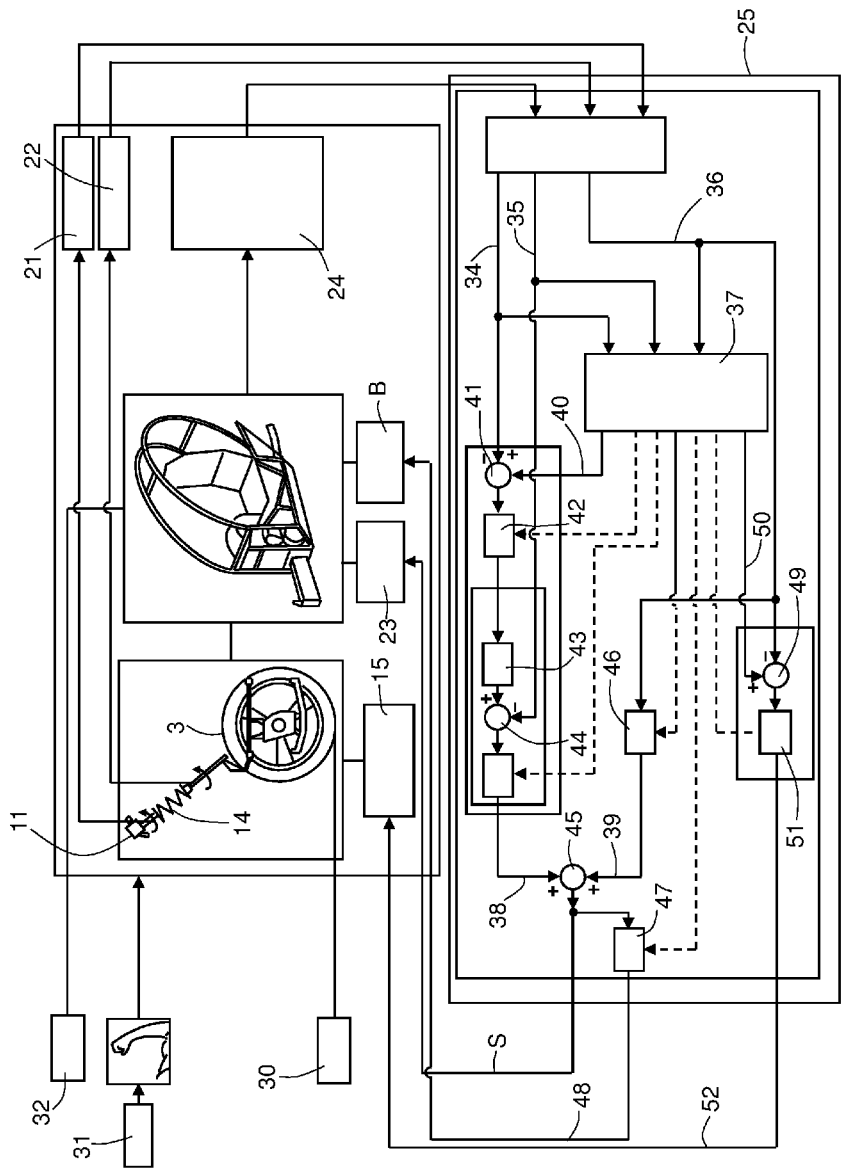
FIG. 4 is a block diagram of a control method implemented to control the vehicle of FIG. 1.

FIG. 4 shows in a greater detail how tilting control unit of vehicle 1, resilient joint 14 and steering actuator 15 are connected.

Main input to the system are road profile 30 torque 31 on handlebar 11 and external forces acting on the frame, e.g. wind 32.

Furthermore, frame 2 is equipped with sensors 24 measuring longitudinal speed, right wishbone angle, left wishbone angle, crank angle, lateral acceleration.

The output of sensors 24 are elaborated by a state observer to obtain the estimated values over time of parameters such as estimated lateral acceleration 34, and estimated roll angle 35. Other parameters are: estimated crank angle, estimated right wishbone angle, estimated left wishbone angle, estimated longitudinal speed, estimated angle of steering column portion 13', estimated angle of steering column portion 13" and estimated steering column deformation 36, defined as difference between estimated angles of steering column portion 13', 13".

All the above parameters are then elaborated by a supervisor 37 that is programmed with the control algorithm for frame 2.

In particular, ECU implements a feedback control 38 for tilt torque, a feedforward control 39 for tilt torque and a reference torque control for steering actuator 15 of front wheels 3.

In greater detail, feedback control 38 has a first input defined by estimated lateral acceleration 34 and a second input, defined by desired lateral acceleration 40 set by supervisor 37.

Estimated and lateral acceleration 34, 37 are processed by a subtraction node 41 and the resulting error signal is multiplied by a variable gain 42 controlled by supervisor 37.

The resulting gained error signal is processed by prefilter 43 and subtracted to estimated roll angle 35 in node 44. The resulting error signal is an input for an addition node 45.

Feedforward control 39 comprises estimated steering column deformation 36 and a gain 46 controlled by supervisor 37. The resulting gained signal is processed in addition node 45 to generate control signal S for actuating means 23.

Signal S is also split downstream to node 45 and processed by a variable gain 47 controlled by supervisor 37 to generate signal 48 enabling brake B.

Therefore, control signal S has a mixed structure defined by both a feedforward component and a feedback component.

As mentioned before, ECU 25 also controls steering actuator 15. In particular, estimated steering column deformation 36 is split before entering in supervisor 37 and processed in a subtraction node 49 with desired steering column deformation 50 set by supervisor 37.

The resulting error signal is processed by a variable gain 51 to obtain control signal 52 for steering actuator 15.

The advantages of vehicle 1 according to the present invention are the following.

Frame 2 and front wheels 3 tilt to provide in combination a turning effect and a decrease in lateral acceleration. In particular, the center of gravity of frame 2 and all of the components attached thereto moves towards the center of curvature of the bend and generate a momentum opposite to that generated by centrifugal inertial force resulting in a reduced overall momentum applied to the frame. Therefore, reaction between the ground and front wheels 3 due to such overall momentum is reduced and either the track of the wheels 3 can be reduced or the maximum speed of the vehicle running the bend can increase without impacting on stability.

Such principle is applied to a vehicle having three wheels and two front steering wheels and the effect is particularly appreciated in that the lateral dimension of the vehicle may be decreased to achieve a stability that is superior to that of two wheeled vehicles with a minimum increase in lateral dimension, in order to be more agile in traffic compared to four wheeled vehicles. All the above advantages are achievable because handlebar 11 is connected to Lastly, it is clear that modifications and variations may be made to the vehicle described herein without departing from the scope of protection of the present invention, as defined in the appended claims.

Resilient joint 14 can be totally absent so that front wheels 3 steer by wire.

Alternatively, torsional stiffness control of device 12 can be avoided to simplify ECU 25 and a comparable functioning can be obtained by the sole variation of time delay of actuation of steering actuator 15 after actuating means 23.

The invention claimed is:

1. Vehicle comprising at least one tiltable steering wheel (3), at least two wheels (3, 4) other than the steering wheel (3), control means (11) suitable for being operated by a driver to steer said steering wheel (3), a frame (2) supported by said wheels (3, 4) and tiltable together with said at least one steering wheel (3) with respect to a ground surface when the vehicle turns and first actuating means (23) to control a tilting position of said frame (2) and of said at least one steering wheel (3), characterized by comprising a decoupling device (14) to decouple said control means (11) from said steering wheel (3), a control unit (25) configured so that said first actuating means (23) tilt said frame (2) and said at least one tiltable steering wheel (3) when said control means (11) are operated by the driver, second actuating means (15) connected to said control unit (25) to control the steering angle of said steering wheel (3) and a speed sensor (24) connected to said control unit (25) to measure a speed of the vehicle, and in that said control unit (25) is configured to activate said second actuating means (15) depending on the speed measured by said speed sensor (24), wherein said control unit (25) is configured to activate said second actuating means (15) with a time delay with respect to said first actuating means (23).

2. Vehicle according to claim 1, characterized in that said decoupling device (14) has a variable torsional stiffness controlled by said control unit (25).

3. Vehicle according to claim 2, characterized in that said control unit (25) is configured to decrease the torsional stiffness of said decoupling device (14) when the speed of the vehicle increases.

4. Vehicle according to claim 1, characterized in that said control unit (25) is configured to increase said time delay as the speed of the vehicle increases.

5. Vehicle according to claim 1, characterized by comprising a second steering wheel (3), in that said first and second steering wheels are front wheels, and in that said steering wheels are connected to said frame (2) to tilt in a coordinated way with said frame (2).

6. Vehicle according to claim 5, characterized by having no more than three wheels, one of which is a non-steering wheel tilting with said frame (2).

7. Vehicle according to claim 1, characterized in that said decoupling device (14) comprises stop means (18, 19, 20) configured to define a maximum decoupling angle between said control means (11) and said steering wheel (3).

8. Vehicle according to claim 7, characterized in that said decoupling device (14) comprises a torsional spring (16) interposed between said control means (11) and said steering wheel (3).

9. Vehicle according to claim 8, characterized in that said control unit (25) is configured to detect a torque applied to said control means (11) by the driver.

10. Vehicle according to claim 1, characterized in that said control unit (25) comprises a feedforward control (39) to control said first actuating means (23).

11. Vehicle according to claim 10, characterized in that said control unit (25) comprises a feedback control (38) combined with said feedforward control (39) to control said first actuating means (23).

12. Vehicle according to claim 1, characterized by comprising a lateral accelerator (24) fixed to said frame (2) and connected to said control unit (25), said control unit (25) being configured so that said frame (2) is tilted after said control means (11) are operated so that the output of said lateral accelerator is not zero in order to give to a user a feeling of centrifugal force.

13. Control method for a vehicle comprising at least one steering wheel (3), at least two wheels (3, 4) other than the steering wheel (3), control means (11) suitable for being directly operated by a driver to steer said steering wheel (3), a frame (2) supported by said wheels (3, 4) and tiltable with respect to a ground when the vehicle steers, first actuating means (23) to control an angular position of said frame (2), a decoupling device (14) decoupling an angular position of said control means (11) to an angular position of said steering wheel (3), second actuating means (15) connected to said control unit (25) to control a steering angle of said steering wheel (3) and a speed sensor (24) connected to said control unit (25) to measure a speed of the vehicle, said method comprising a phase of enabling said actuating means (23) when said control means (11) are operated by a driver and a phase of activating said second actuating means (15) depending on a speed measured by said speed sensor (24), wherein said phase of activating said second actuating means (15) is such that said control unit (25) activates said second actuating means (15) at a given time delay with respect to said phase of activating said first actuating means (23).

14. Control method according to claim 13, characterized by comprising a phase of varying the torsional stiffness of said decoupling device (14).

15. Control method according to claim 14, characterized in that the phase of activating said second actuating means (15) is such that said control unit (25) decreases a rotational stiffness of said decoupling device (14) when the speed of the vehicle increases.

16. Control method according to claim 13, characterized in that said phase of activating said second actuating means (15) is such that said time delay increases with the speed of the vehicle.

17. Control method according to claim 13, characterized in that said vehicle comprises a lateral accelerator (24) fixed to said frame (2) and by comprising a phase of tilting said frame (2) when said control means (11) are operated so that the output of said lateral accelerator is not zero in order to give to the driver a feeling of centrifugal force.

* * * * *